(12) United States Patent
Miyamoto et al.

(10) Patent No.: US 10,211,956 B2
(45) Date of Patent: Feb. 19, 2019

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Kenji Miyamoto, Yokosuka (JP); Shigeru Kuwano, Yokosuka (JP); Jun Terada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/552,724

(22) PCT Filed: Mar. 3, 2016

(86) PCT No.: PCT/JP2016/056570
§ 371 (c)(1),
(2) Date: Aug. 22, 2017

(87) PCT Pub. No.: WO2016/140303
PCT Pub. Date: Sep. 9, 2016

(65) Prior Publication Data
US 2018/0048439 A1 Feb. 15, 2018

(30) Foreign Application Priority Data

Mar. 5, 2015 (JP) .................................. 2015-043880

(51) Int. Cl.
| | | |
|---|---|---|
| *H04B 7/024* | (2017.01) | |
| *H04W 16/28* | (2009.01) | |
| *H04L 5/00* | (2006.01) | |
| *H04B 7/08* | (2006.01) | |
| *H04W 28/16* | (2009.01) | |
| *H04L 27/26* | (2006.01) | |

(52) U.S. Cl.
CPC ........... *H04L 5/0035* (2013.01); *H04B 7/024* (2013.01); *H04B 7/08* (2013.01); *H04L 27/2601* (2013.01); *H04W 16/28* (2013.01); *H04W 28/16* (2013.01)

(58) Field of Classification Search
CPC ....... H04B 7/024; H04B 7/08; H04L 27/2601; H04L 5/0035; H04W 16/28; H04W 28/16
(Continued)

(56) References Cited

U.S. PATENT DOCUMENTS

2002/0119780 A1  8/2002  Roux et al.
2007/0149135 A1  6/2007  Larsson et al.
(Continued)

FOREIGN PATENT DOCUMENTS

| JP | H07-326994 A | 12/1995 |
| JP | 2004-236040 A | 8/2004 |
| JP | 2014-230196 A | 12/2014 |

OTHER PUBLICATIONS

Andreas Maeder et al., Proc. EuCNC2014, pp. 1-5, "Towards a Flexible Functional Split for Cloud-RAN Networks," Jun. 2014.
(Continued)

*Primary Examiner* — Phong La
(74) *Attorney, Agent, or Firm* — Harness, Dickey & Pierce, P.L.C.

(57) ABSTRACT

A wireless communication system includes distributed units communicating with a terminal device and a central unit connected to the distributed units and receiving and processing signals from the distributed units. The central unit includes a host function unit to pre-notify the distributed units if a received signal from the terminal device is a target of coordination between distributed units, hard/soft determination units configured to separate received signals from the distributed units into a hard decision value and a soft
(Continued)

decision value based on presence or absence of coordination between the distributed units, transmit the hard decision value to the host function unit as is, and transmit the soft decision value to a signal combining unit, the signal combining unit combines soft decision values output from the hard/soft determination units and outputs a combined soft decision value, and a decoding unit performs decoding using the soft decision value output from the signal combining unit.

4 Claims, 6 Drawing Sheets

(58) Field of Classification Search
 USPC .................................................. 370/329
 See application file for complete search history.

(56) References Cited

U.S. PATENT DOCUMENTS

| | | | | |
|---|---|---|---|---|
| 2010/0014487 | A1* | 1/2010 | Attar | H04J 9/00 370/335 |
| 2011/0096858 | A1* | 4/2011 | Klimer | H04B 7/0854 375/267 |
| 2012/0165066 | A1* | 6/2012 | Xiao | H04L 5/0037 455/525 |
| 2014/0161023 | A1* | 6/2014 | Seo | H04B 7/024 370/315 |
| 2014/0362942 | A1* | 12/2014 | Wood | H04B 15/00 375/267 |
| 2016/0036571 | A1* | 2/2016 | Park | H04B 7/024 370/330 |
| 2016/0037425 | A1* | 2/2016 | Van Lieshout | H04W 36/08 370/332 |

OTHER PUBLICATIONS

Tomoaki Ohtsuki, Journal of the Institute of Electronics, Information and Communication Engineers vol. 90, No. 7, "Communication Technology: Basic Knowledge and its trend [III]: Error-Correction Coding," Jul. 2007, with partial translation thereof.

Juho Lee et al., IEEE Communications Magazine, vol. 50, No. 11, pp. 44-50, "Coordinated Multipoint Transmission and Reception in LTE-Advanced Systems," Nov. 2012.

International Search Report for PCT/JP2016/056570, ISA/JP, Tokyo, dated May 17, 2016, with English translation.

Extended European Search Report for parallel application EP16758995.1, EPO, Munich, dated Sep. 18, 2018.

* cited by examiner

WIRELESS COMMUNICATION SYSTEM AND WIRELESS COMMUNICATION METHOD

TECHNICAL FIELD

The present invention relates to a wireless communication system which physically extends some functions of a base station and uses the base station as a distributed unit.

Priority is claimed on Japanese Patent Application No. 2015-43880, filed Mar. 5, 2015, the content of which is incorporated herein by reference.

BACKGROUND ART

A system configuration in which a plurality of distributed units equipped with some of base station functions are extended in a wireless communication system, particularly a mobile communication system, has been studied. A base station obtained by extending a distributed unit has a function of controlling a plurality of distributed units as a central unit. In a communication scheme of performing communication between the central unit and the distributed units, two system configurations such as full centralization and partial centralization, which differ in a function distribution between the central unit and the distributed unit, are being studied.

FIG. 3 is a block diagram illustrating a system configuration of full centralization. In the system configuration of full centralization, as illustrated in FIG. 3, the central unit 301 is equipped with a physical layer function unit 11 from which an antenna unit is excluded and a functional unit 12 of a data link layer or a higher layer. Also, in the system configuration, n (n is a natural number) distributed units 302-1 to 302-n equipped with only an antenna unit 21 are extended.

FIG. 4 is a block diagram illustrating a system configuration of partial centralization. In the system configuration of partial centralization, the functional unit 12 of the data link layer or the higher layer and some functions 13 of physical layer functions are installed in the central unit 401 as illustrated in FIG. 4. Also, in the system configuration, distributed units 402-1 to 402-n equipped with some functions 22 of the physical layer functions are extended (for example, see Non-Patent Document 1).

Also, in a communication system, error correction code technology for correcting an error in a transmission path by assigning redundant bits to a signal bit sequence to be transmitted is known (for example, see Non-Patent Document 2). In this error correction code technology, a signal bit sequence to which a redundant bit is assigned by a transmission device is modulated into any form, transmitted through a transmission path, and received by a reception device. At this time, when the received modulated signal is demodulated, a process of determining whether a signal bit is 0 or 1 on the basis of a certain threshold value and outputting a determination result as a received bit sequence is called hard decision, and its output is called a hard decision value.

On the other hand, when the modulated signal is demodulated, outputting the demodulated signal as a received signal with a likelihood value of a signal bit of 0 or 1 is called a soft decision output, and its output is called a soft decision value. A received signal output as a hard decision value or a soft decision value is output as a final received bit sequence by a decoder. Among decoders, a decoder can select whether an output is a hard decision value or a soft decision value as in a turbo decoder.

On the other hand, an area covered by one base station in a mobile communication system is referred to as a cell, and the coverage area thereof generally overlaps between adjacent cells. Thus, when a terminal device is located near a cell edge, a phenomenon that a radio signal transmitted from the terminal device to a desired base station and a radio signal transmitted from the terminal device belonging to an adjacent base station interfere with each other and a transmission rate between the terminal device and the base station is significantly degraded becomes a problem. Coordinated multi-point transmission/reception (CoMP) technology (see, for example, Non-Patent Document 3) has been studied as means for solving the problem of inter-cell signal interference.

FIG. 5 is a schematic diagram of CoMP using two base stations 4 and 5. FIG. 6 is a schematic diagram of CoMP using one central unit 1 and two distributed units 2-1 and 2-2.

As illustrated in FIG. 5, in CoMP, adjacent base stations 4 and 5 communicate with each other in coordination with a terminal device 6 located near the cell edge. In FIG. 6, the distributed units (base stations) 2-1 and 2-2 connected to the adjacent central unit 1 communicate with each other in coordination with the terminal device 6 located near the cell edge.

DOCUMENTS OF THE PRIOR ART

Non-Patent Document

[Non-Patent Document 1]
Proc. EuCNC 2014, pp. 1-5, "Towards a Flexible Functional Split for Cloud-RAN Networks," June 2014.
[Non-Patent Document 2]
Journal of the Institute of Electronics, Information and Communication Engineers Vol. 90, No. 7, "Communication Technology: Basic Knowledge and its trend [III]: Error-Correction Coding," July 2007.
[Non-Patent Document 3]
IEEE Communications Magazine, Vol. 50, No. 11, pp. 44-50, "Coordinated Multipoint Transmission and Reception in LTE-Advanced Systems," November 2012.

SUMMARY OF INVENTION

Problems to be Solved by the Invention

FIG. 7 is a block diagram illustrating a system configuration of full centralization for performing CoMP processing. Here, the number of distributed units is not necessarily limited to 2, and the number of antennas provided in one distributed unit may be two or more.

A radio signal transmitted from a terminal device 6 is received by RF receiving units 22 of distributed units 302-1 and 302-2 via wireless transmission. A signal received by each of the distributed units 302-1 and 302-2 is subjected to signal conversion by a signal converting unit 23 and transmitted to a central unit 301. These signals are subjected to signal conversion by signal converting units 14 and 15 and supplied to an inter-base-station coordination processing unit 16. The inter-base-station coordination processing unit 16 performs CoMP processing on the supplied signals. Thereafter, the output of the inter-base-station coordination processing unit 16 is demodulated by the demodulation unit 17 and output to a decoding unit 18 as a soft decision value of a received signal. The decoding unit 18 decodes the soft decision value and outputs the decoded value as a hard decision value of the received signal to a host function unit 19. The host function unit 19 further transmits the hard decision value of the received signal to a host device.

In the signal transmission in such a system configuration of full centralization, there is a problem in that a transmission capacity between a distributed unit and a central unit is significantly large because transmission of a signal obtained by sampling and quantizing a signal received by the RF receiving unit 22 is performed. For example, if a common public radio interface (CPRI) is used for signal transmission, a necessary transmission rate between the distributed unit and the central unit is 1228 Mbps which is about 16 times 75 Mbps when communication of a wireless section is performed at a transmission rate of 75 Mbps.

FIG. 8 is a block diagram illustrating a system configuration of partial centralization.

Compared with the system configuration of full centralization illustrated in FIG. 7, the configuration illustrated in FIG. 8 can reduce the transmission capacity required between the central unit 401 and the distributed units 402-1 and 402-2. Here, the number of distributed units is not necessarily limited to 2, and the number of antennas provided in one distributed unit may be two or more. A radio signal transmitted from the terminal device 6 is received by either the distributed unit 402-1 or the distributed unit 402-2 via wireless transmission.

In the system configuration illustrated in FIG. 8, as an example, a signal from the terminal device 6 is received by the distributed unit 402-1. After the signal from the terminal device 6 is received by the RF receiving unit 22, the distributed unit 402-1 demodulates the signal with the demodulation unit 24 and outputs the demodulated signal as a soft decision value of the received signal to the decoding unit 25. The decoding unit 25 decodes the soft decision value and outputs the decoded soft decision value as a hard decision value of the received signal to the signal converting unit 23. The signal converting unit 23 converts the signal into the hard decision value and transmits the hard decision value to the central unit 401. The central unit 401 performs signal conversion on the signal received by the signal converting unit 14, and transmits a hard decision value of the converted received signal to the host function unit 19. The host function unit 19 further transmits the hard decision value of the received signal to the host device.

Because physical layer functions such as demodulation and decoding are distributed in the system configuration of partial centralization as described above, CoMP processing requiring a signal before demodulation cannot be performed. That is, because only one of the distributed unit 402-1 and the distributed unit 402-2 can receive a signal from the terminal device 6, there is a problem in that it is impossible to perform the CoMP processing which is possible in the system of full centralization illustrated in FIG. 7.

The present invention has been made in view of the above circumstances, and an objective of the present invention is to provide a wireless communication system and a wireless communication method capable of enabling coordination of communication between distributed units (base stations) while reducing a transmission capacity between a central unit and a distributed unit.

Means for Solving the Problems

The present invention is a wireless communication system comprising distributed unit equipment which wirelessly communicate with a terminal device and central unit equipment which is connected to the distributed unit equipment and receives and processes signals from the distributed unit equipment, the central unit equipment comprising: a host function unit configured to pre-notify the distributed unit equipment of whether or not a received signal from the terminal device is a target of coordination between distributed units; hard/soft determination units each configured to separate the received signals from the distributed unit equipment into a hard decision value and a soft decision value on the basis of presence or absence of coordination between the distributed units, transmit the hard decision value to the host function unit as it is, and transmit the soft decision value to a signal combining unit; the signal combining unit configured to combine soft decision values output from the hard/soft determination units and output a combined soft decision value; and a decoding unit configured to perform decoding using the soft decision value output from the signal combining unit, and the distributed unit equipment comprising: a switching decoding unit configured to output a received signal from the terminal device which is not a target of coordination between the distributed units as the hard decision value and output a received signal from the terminal device serving as the target of the coordination between the distributed units as the soft decision value on the basis of the presence or absence of the coordination between the distributed units for which the notification is provided from the host function unit.

In the wireless communication system of the present invention, the distributed unit equipment may increment or decrement the number of bits indicating the soft decision value output by the switching decoding unit according to an intensity of a received signal from the terminal device.

In the wireless communication system of the present invention, the distributed unit equipment may perform weighting on a soft decision value output by the switching decoding unit according to an intensity of a received signal from the terminal device.

The present invention is a wireless communication method to be performed by a wireless communication system including distributed unit equipment which wirelessly communicate with a terminal device and central unit equipment which is connected to the distributed unit equipment and receives and processes signals from the distributed unit equipment, the wireless communication method comprising: a host function step in which the central unit equipment pre-notify the distributed unit equipment of whether or not a received signal from the terminal device is a target of coordination between distributed units; a hard/soft determination step in which the central unit equipment separate the received signals from the distributed unit equipment into a hard decision value and a soft decision value on the basis of presence or absence of coordination between the distributed units, transmit the hard decision value to a host function unit as it is, and transmit the soft decision value to a signal combining unit; a signal combining step of combining the soft decision values output from the hard/soft determination step and outputting a combined soft decision value; a decoding step of performing a decoding process using the soft decision value output from the signal combining step; and a switching decoding step in which the distributed unit equipment output a received signal from the terminal device which is not a target of coordination between the distributed units as the hard decision value and output a received signal from the terminal device serving as the target of the coordination between the distributed units as the soft decision value on the basis of the presence or absence of the coordination between the distributed units for which the notification is provided from the host function unit.

Advantageous Effects of the Invention

According to the present invention, there is an advantageous effect in that a transmission capacity between a central unit and a distributed unit is reduced and coordination of communication between distributed units (base stations) is enabled.

EMBODIMENTS FOR CARRYING OUT THE INVENTION

First Embodiment

Figure 1:
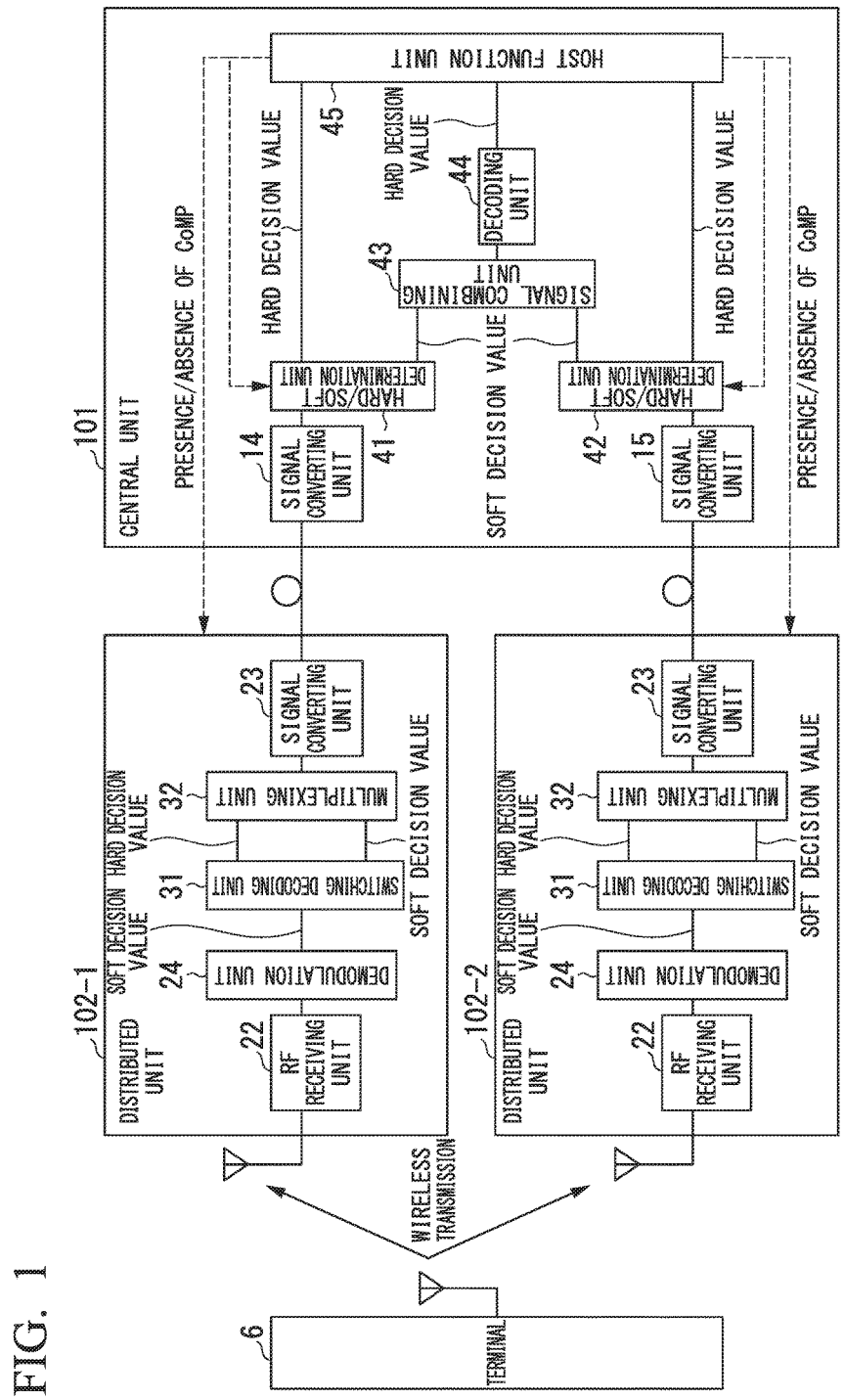
FIG. 1 is a block diagram illustrating a configuration of a wireless communication system according to a first embodiment of the present invention.
Figure 7:
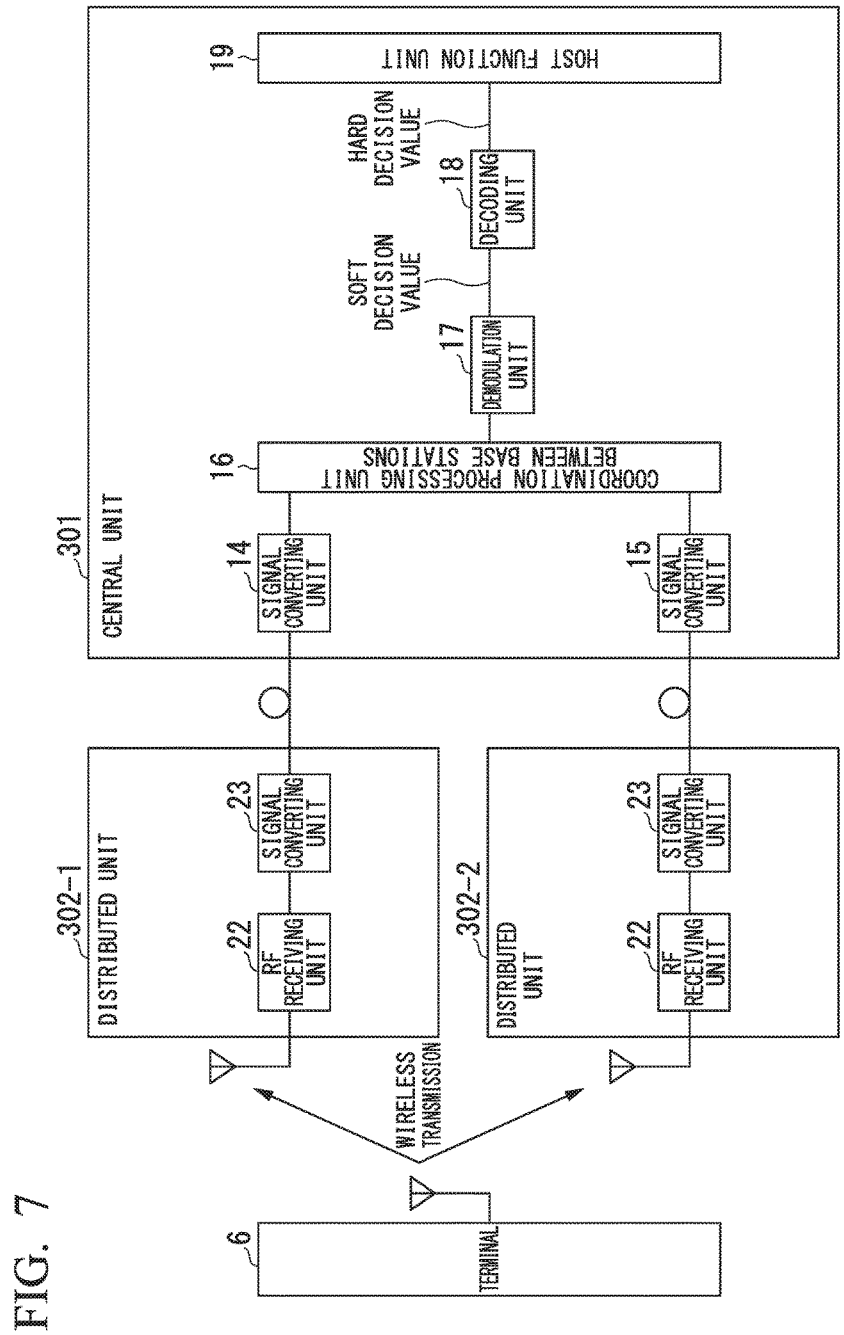
FIG. 7 is a block diagram illustrating a specific example of a system of fill centralization in conventional technology.
Figure 8:
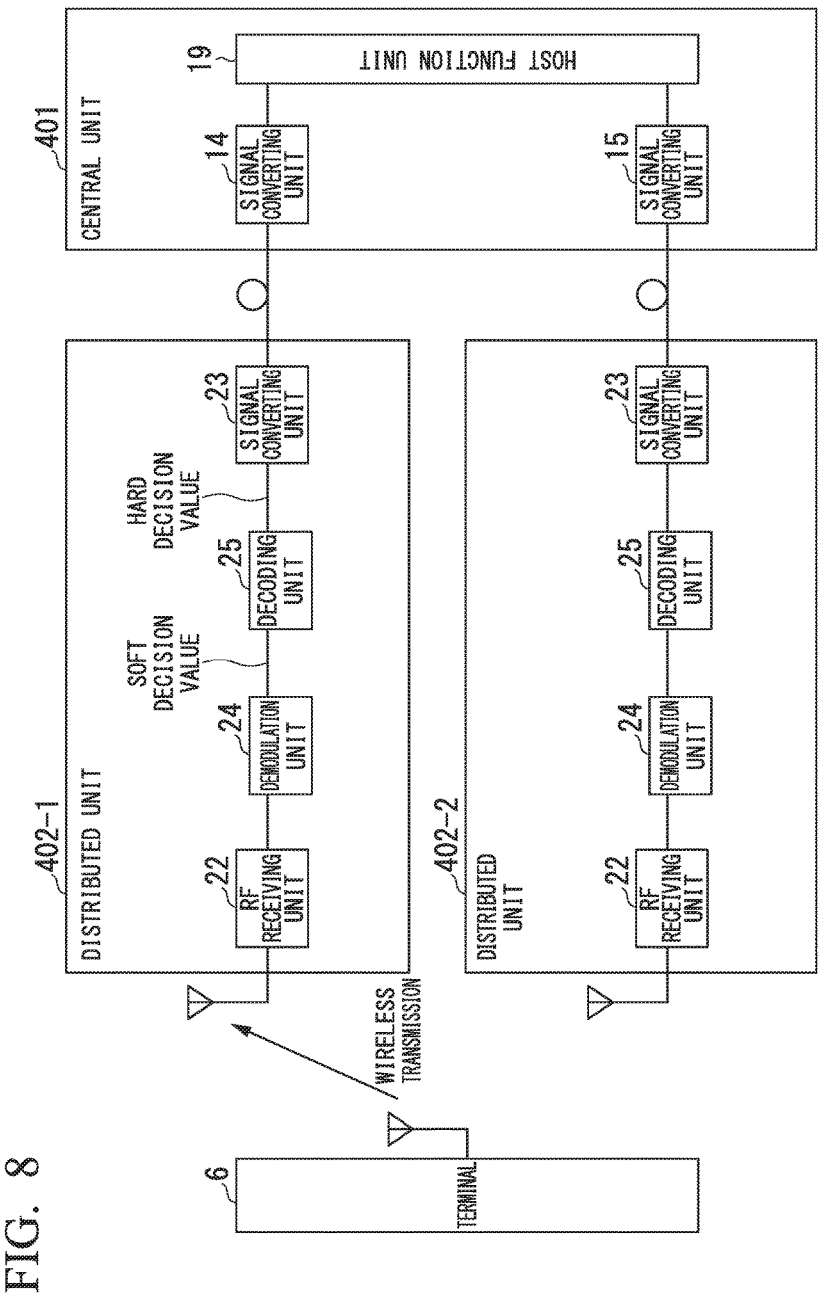
FIG. 8 is a block diagram illustrating a specific example of a system of partial centralization in conventional technology.

Hereinafter, a wireless communication system according to the first embodiment of the present invention will be described with reference to the drawings. FIG. 1 is a block diagram illustrating a configuration of the first embodiment. In FIG. 1, parts the same as those of the conventional devices illustrated in FIGS. 7 and 8 are denoted by the same reference signs, and description thereof will be omitted. It is not necessary to limit the number of distributed units to 2, and the number of antennas provided in one distributed unit may be two or more. Also, the number of terminal devices 6 may be two or more, and the number of antennas of a terminal device 6 may be two or more.

A distributed unit 102-1 is provided with a radio frequency (RF) receiving unit 22 connected to an antenna, a demodulation unit 24, a switching decoding unit 31, a multiplexing unit 32, and a signal converting unit 23. Because a distributed unit 102-2 has a configuration similar to that of the distributed unit 102-1, detailed description thereof will be omitted here.

A central unit 101 includes two signal converting units 14 and 15 which are equal in number to the number of distributed units, hard/soft determination units 41 and 42 respectively connected to the signal converting units 14 and 15, a signal combining unit 43 which combines soft decision values output by the hard/soft determination units 41 and 42, a decoding unit 44 which decodes an output of the signal combining unit 43, and a host function unit 45.

Next, the operation of the wireless communication system illustrated in FIG. 1 will be described. First, the host function unit 45 of the central unit 101 pre-notifies the distributed units 102-1 and 102-2 of whether or not a signal transmitted from the terminal device 6 is a CoMP target.

Next, if the transmitted signal is a CoMP target, the signal transmitted from the terminal device 6 is received by both the distributed unit 102-1 and the distributed unit 102-2, and demodulated by the demodulation units 24 of the distributed units 102-1 and 102-2, so that a soft decision value of the received signal is obtained. If the transmitted signal is not a CoMP target, the signal transmitted from the terminal device 6 is received by the distributed unit 102-1 or the distributed unit 102-2 and demodulated by the demodulation unit 24 of one distributed unit, so that a soft decision value of the received signal is obtained.

Next, on the basis of information of the presence or absence of CoMP for which a notification is provided from the host function unit 45 of the central unit 101, the switching decoding unit 31 switches a hard decision value output and a soft decision value output and supplies the hard decision value output and the soft decision value output to the multiplexing unit 32. The switching decoding unit 31 outputs a signal which is not a CoMP target as a hard decision value, and outputs a signal which is a CoMP target as a soft decision value.

The multiplexing unit 32 performs time division multiplexing on the hard decision value and the soft decision value output from the switching decoding unit 31, the signal converting unit 23 converts a time division multiplexing result into a signal, and then the signal is transmitted to the central unit 101. On the basis of information of presence or absence of CoMP for which a notification is provided from the host function unit 45, the central unit 101 determines signals received through signal conversion by the signal converting units 14 and 15 as a hard decision value and a soft decision value and separates the hard decision value and the soft decision value in the hard/soft determination units 41 and 42. Furthermore, the central unit 101 transmits the hard decision value to the host function unit 45 as it is, and transmits the soft decision value to the signal combining unit 43.

Soft decision values output from the hard/soft determination units 41 and 42 are combined by the signal combining unit 43 and then a combined soft decision value is transmitted to the decoding unit 44. The decoding unit 44 performs a decoding process on the basis of the input soft decision value, outputs a hard decision value of the received signal, and transmits the hard decision value to the host function unit 45.

Also, an interface such as an existing passive optical network (PON) may be used for signal conversion used for signal transmission between the distributed units 102-1 and 102-2 and the central unit 101, or a unique interface may be used. Also, each of the distributed units 102-1 and 102-2 may perform a process of receiving a multicarrier signal such as orthogonal frequency-division multiplexing (OFDM) on the received signal after performing RF reception from the terminal device 6.

Also, the switching decoding unit 31 may increase or decrease the number of bits representing a soft decision value to be output in accordance with an intensity of a received signal from the terminal device. Thereby, a transmission capacity between the central unit and the distributed unit can be further suppressed.

Also, the switching decoding unit 31 may perform weighting on the soft decision value to be output according to the intensity of the received signal from the terminal device. This makes it possible to perform coordination for CoMP processing among a plurality of distributed units with higher performance.

Second Embodiment

Figure 2:
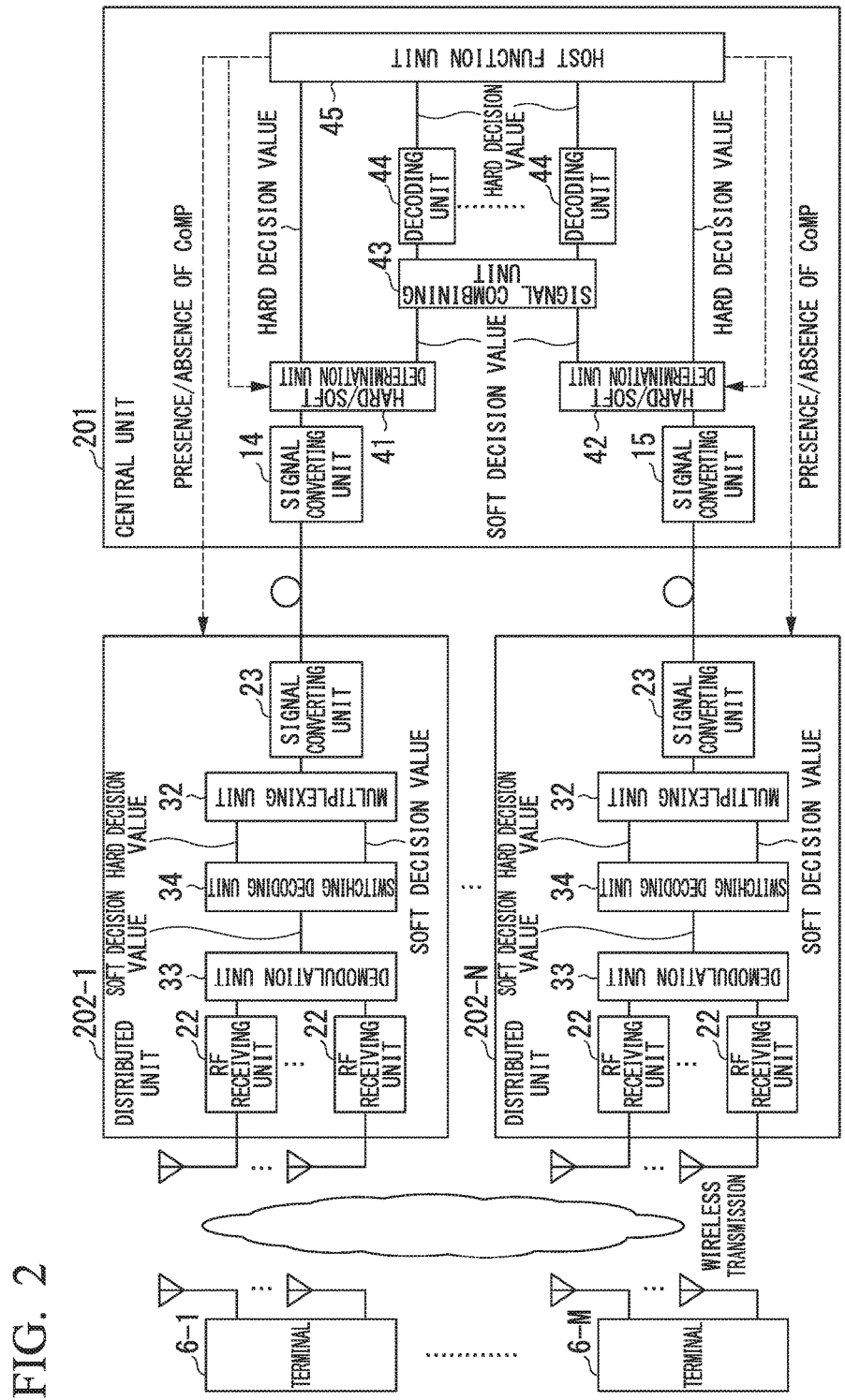
FIG. 2 is a block diagram illustrating a configuration of a wireless communication system according to a second embodiment of the present invention.
Figure 3:
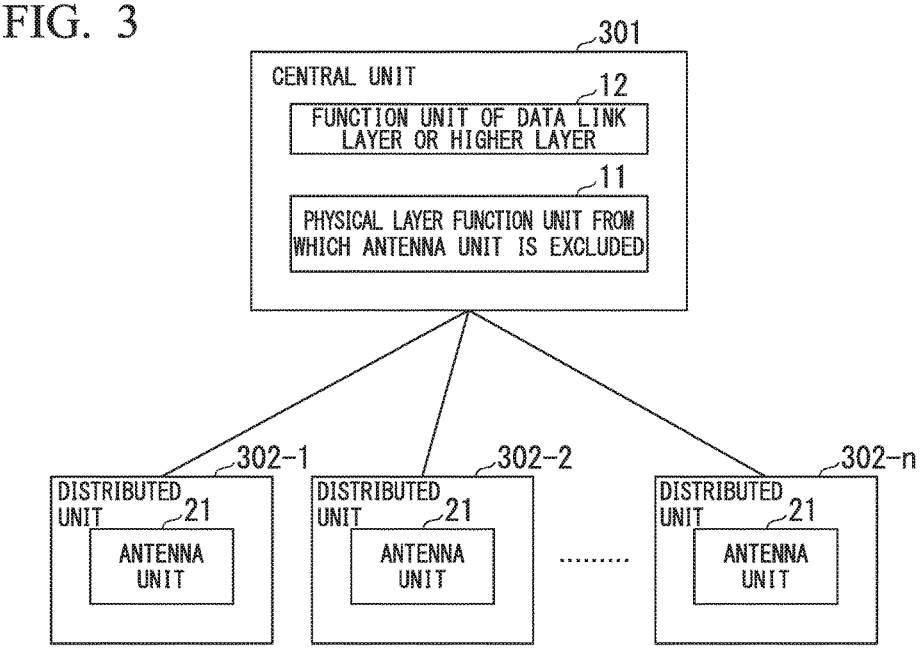
FIG. 3 is a block diagram illustrating a system configuration of full centralization in conventional technology.
Figure 4:
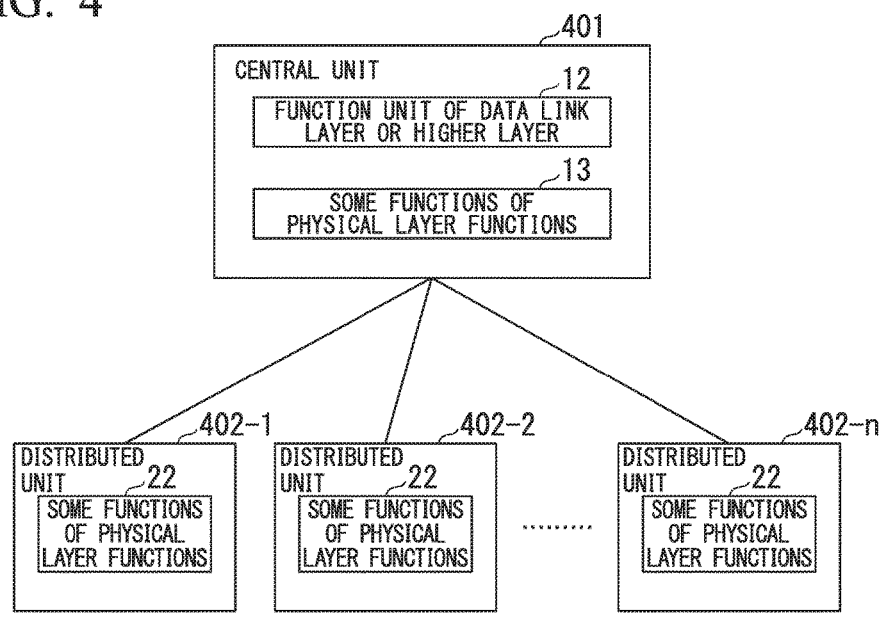
FIG. 4 is a block diagram illustrating a system configuration of partial centralization in conventional technology.
Figure 5:
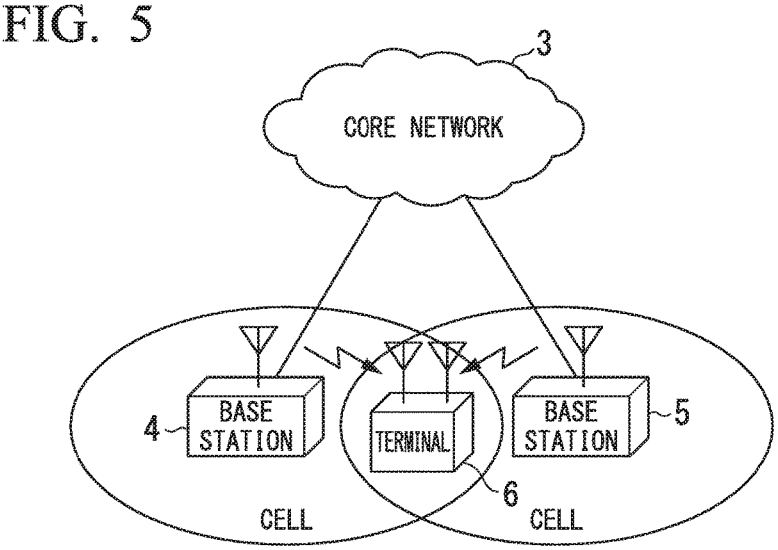
FIG. 5 is a diagram illustrating CoMP processing by two base stations in conventional technology.
Figure 6:
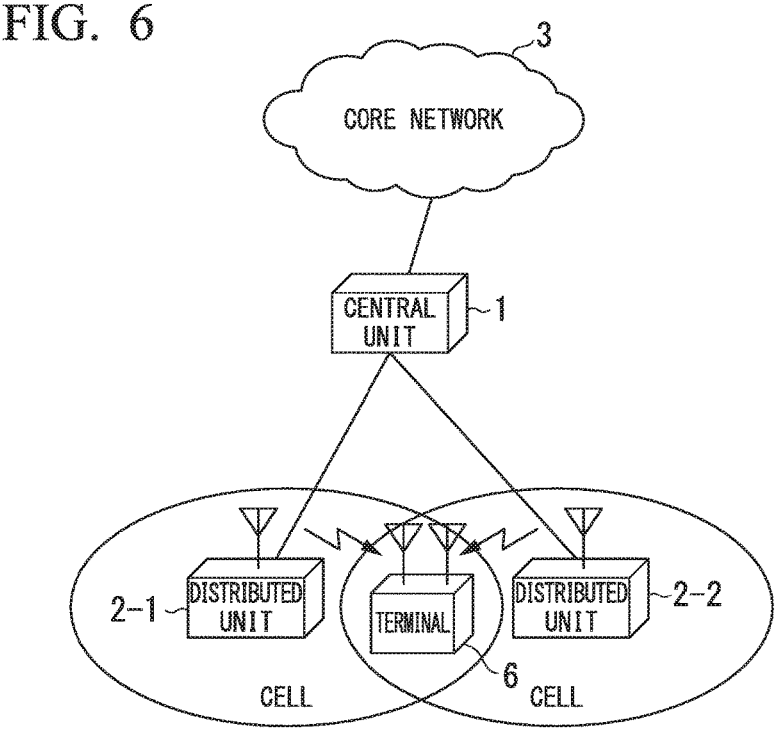
FIG. 6 is a diagram illustrating CoMP processing by a central unit and a distributed unit in conventional technology.

Next, a wireless communication system according to the second embodiment of the present invention will be described with reference to the drawings FIG. 2 is a block diagram illustrating the configuration of the second embodiment. In FIG. 2, parts the same as those of the wireless communication system according to the first embodiment illustrated in FIG. 1 are denoted by the same reference signs, and description thereof will be omitted. As illustrated in FIG. 2, the wireless communication system is different from the wireless communication system illustrated in FIG. 1 in that the number of terminal devices 6, the number of antennas of each terminal device, the number of distributed units, and the number of antennas of each distributed unit may be any number.

Here, the number of terminal devices is M (M is a natural number) and the number of distributed units is N (N is a natural number). Signals transmitted from terminal devices 6-1 to 6-M are received by RF receiving units 22 of distributed units 202-1 to 202-N through wireless transmission. A demodulation unit 33 of each distributed unit obtains a soft decision value of a received signal. Here, the demodulation unit 33 also performs a signal reception process based on a plurality of antennas such as multiple-input multiple-output (MIMO).

Next, the operation of the wireless communication system illustrated in FIG. 2 will be described.

First, a host function unit 45 of a central unit 201 pre-notifies each of the distributed units 202-1 to 202-N of whether or not signals received from the terminal devices 6-1 to 6-M are CoMP targets.

A process of a switching decoding unit 34 on a soft decision value obtained by the demodulation unit 33 is similar to that of the first embodiment. If received signals received from the terminal devices 6-1 to 6-M are not CoMP targets, the received signals are output as hard decision values from switching decoding units 34 of the distributed units 202-1 to 202-N and transmitted to the central unit 201 via a multiplexing unit 32 and a signal converting unit 23. The hard decision values received by the central unit 201 are determined and separated by hard/soft determination units 41 and 42 of the central unit 201 and transmitted to the host function unit 45.

If the received signals received from the terminal devices 6-1 to 6-M are CoMP targets, the received signals are output as soft decision values from the switching decoding units 34 of the distributed units 202-1 to 202-N and transmitted to the central unit 201 via the multiplexing unit 32 and the signal converting unit 23. The soft decision values received by the central unit 201 are determined and separated by the hard/soft determination units 41 and 42 of the central unit 201 and transmitted to the signal combining unit 43. The soft decision values input to the signal combining unit 43 are combined and transmitted to the decoding unit 44. The decoding unit 44 performs a decoding process on the basis of the input soft decision value and transmits a hard decision value of the received signal to the host function unit 45.

Also, an interface such as an existing PON may be used for signal conversion used for signal transmission between the distributed units 202-1 to 202-N and the central unit 1 or a unique interface may be used. Also, each distributed unit may perform a process of receiving a multicarrier signal such as OFDM on the received signal after performing RF reception from the terminal device 6.

Also, the switching decoding unit 34 illustrated in FIG. 2 may increase or decrease the number of bits representing a soft decision value to be output in accordance with an intensity of a received signal from the terminal device. Thereby, a transmission capacity between the central unit and the distributed unit can be further suppressed.

Also, the switching decoding unit 34 may perform weighting on the soft decision value to be output according to the intensity of the received signal from the terminal device. This makes it possible to perform coordination for CoMP processing among a plurality of distributed units with higher performance.

Thus, in a mobile communication (wireless communication) system including a central unit and a plurality of distributed units, it is possible to perform a process of eliminating signal interference between distributed units even when a system configuration based on partial centralization in which functions of the antenna unit and the physical layer are cut out is used in the distributed unit.

In the system configuration based on partial centralization, because data transmitted between the central unit and the distributed unit becomes a bit sequence after decoding is performed, a transmission capacity between the central unit and the distributed unit is significantly smaller than in the case of full centralization. However, in the system configuration based on partial centralization, the functions of the physical layer are distributed, and coordination between the base stations using both of the received signals received by the two distributed units cannot be made.

In the present embodiment, the transmission capacity between the distributed unit and the central unit can be reduced, and soft decision values are transmitted between the distributed unit and the central unit in the system configuration based on partial centralization in which CoMP processing cannot be performed. By combining the soft decision values, the CoMP processing can be implemented.

Furthermore, a transmission capacity between the distributed unit and the central unit can be reduced by transmitting a received signal which is not a CoMP target as a hard decision value without transmitting all signals as soft decision values between the distributed unit and the central unit. For example, if the distributed unit receives a radio signal of 1 Gbps and the number of bits of quantization of the soft decision value is 5, a transmission capacity between the distributed unit and the central unit in a conventional scheme becomes 5 Gbps.

On the other hand, if the number of received signals serving as CoMP targets is half of the total, a radio signal of 0.5 Gbps in radio signals of 1 Gbps is transmitted as a hard decision value at 0.5 Gbps and the remaining radio signal of 0.5 Gbps is transmitted as a soft decision value at 2.5 Gbps in the present embodiment. Consequently, in the present embodiment, the transmission capacity between the distributed unit and the central unit is 3 Gbps in total, which is 40% lower than in the conventional scheme.

Some or all of a terminal device, a distributed unit, and a central unit in the above-described embodiments may be implemented by a computer. In this case, these may be implemented by recording a program for implementing functions thereof on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Furthermore, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Also, the above-described program may be a program for implementing some of the above-described functions. Further, the above-described program may be a program capable of implementing the above-described functions in combination with a program already recorded on the computer system or may be a program implemented using hardware such as a programmable logic device (PLD) or a field programmable gate array (FPGA).

While embodiments of the invention have been described above with reference to the drawings, it should be understood that these are exemplary of the invention and are not to be considered as limiting. Additions, omissions, substitutions, and other modifications of components can be made without departing from the spirit or scope of the present invention.

INDUSTRIAL APPLICABILITY

A wireless communication system and a wireless communication method of the present invention can be applied to a field of application which is essential to enable coordination between distributed units (base stations) while reducing a transmission capacity between a central unit and a distributed unit.

REFERENCE SYMBOLS

101, 201 Central unit
14, 15 Signal converting unit
41, 42 Hard/soft determination unit
43 Signal combining unit
44 Decoding unit
45 Host function unit
102-1 to 102-N, 202-1 to 202-N Distributed unit (base station)
22 RF receiving unit
23 Signal converting unit
24 Demodulation unit
31 Switching decoding unit
32 Multiplexing unit
33 Demodulation unit
34 Switching decoding unit
6, 6-1 to 6-M Terminal device

The invention claimed is:

1. A wireless communication system comprising: distributed unit equipment which wirelessly communicate with a terminal device and central unit equipment which is connected to the distributed unit equipment and receives and processes signals from the distributed unit equipment, the central unit equipment comprising:
a host function unit configured to pre-notify the distributed unit equipment of whether or not a received signal from the terminal device is a target of coordination between distributed units;

hard/soft determination units each configured to separate the received signals from the distributed unit equipment into a hard decision value and a soft decision value on the basis of presence or absence of coordination between the distributed units, transmit the hard decision value to the host function unit as it is, and transmit the soft decision value to a signal combining unit;
the signal combining unit configured to combine soft decision values output from the hard/soft determination units and output a combined soft decision value; and
a decoding unit configured to perform decoding using the soft decision value output from the signal combining unit, and
the distributed unit equipment comprising:
a switching decoding unit configured to output a received signal from the terminal device which is not the target of coordination between the distributed units as the hard decision value and output a received signal from the terminal device serving as the target of the coordination between the distributed units as the soft decision value on the basis of the presence or absence of the coordination between the distributed units for which the notification is provided from the host function unit.

2. The wireless communication system according to claim 1, wherein the distributed unit equipment increments or decrements the number of bits indicating the soft decision value output by the switching decoding unit according to an intensity of a received signal from the terminal device.

3. The wireless communication system according to claim 1, wherein the distributed unit equipment perform weighting on a soft decision value output by the switching decoding unit according to an intensity of a received signal from the terminal device.

4. A wireless communication method to be performed by a wireless communication system including distributed unit equipment which wirelessly communicate with a terminal device and central unit equipment which is connected to the distributed unit equipment and receives and processes signals from the distributed unit equipment, the wireless communication method comprising:
a host function step in which the central unit equipment pre-notify the distributed unit equipment of whether or not a received signal from the terminal device is a target of coordination between distributed units;
a hard/soft determination step in which the central unit equipment separate the received signals from the distributed unit equipment into a hard decision value and a soft decision value on the basis of presence or absence of coordination between the distributed units, transmit the hard decision value to a host function unit as it is, and transmit the soft decision value to a signal combining unit;
a signal combining step in which the central unit equipment combine the soft decision values output from the hard/soft determination step and output a combined soft decision value;
a decoding step of performing a decoding process using the soft decision value output from the signal combining step; and
a switching decoding step in which the distributed unit equipment output a received signal from the terminal device which is not the target of coordination between the distributed units as the hard decision value and output a received signal from the terminal device serving as the target of the coordination between the distributed units as the soft decision value on the basis of the presence or absence of the coordination between the distributed units for which the notification is provided from the host function unit.

* * * * *